Nov. 27, 1951
G. S. McGUIRE
2,576,259
HANDLE ATTACHMENT FOR BAG CONTAINERS
Filed May 15, 1950
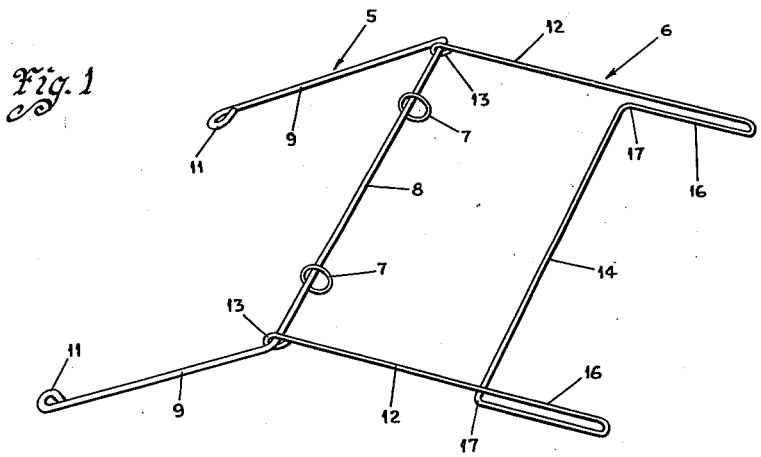
Fig. 1
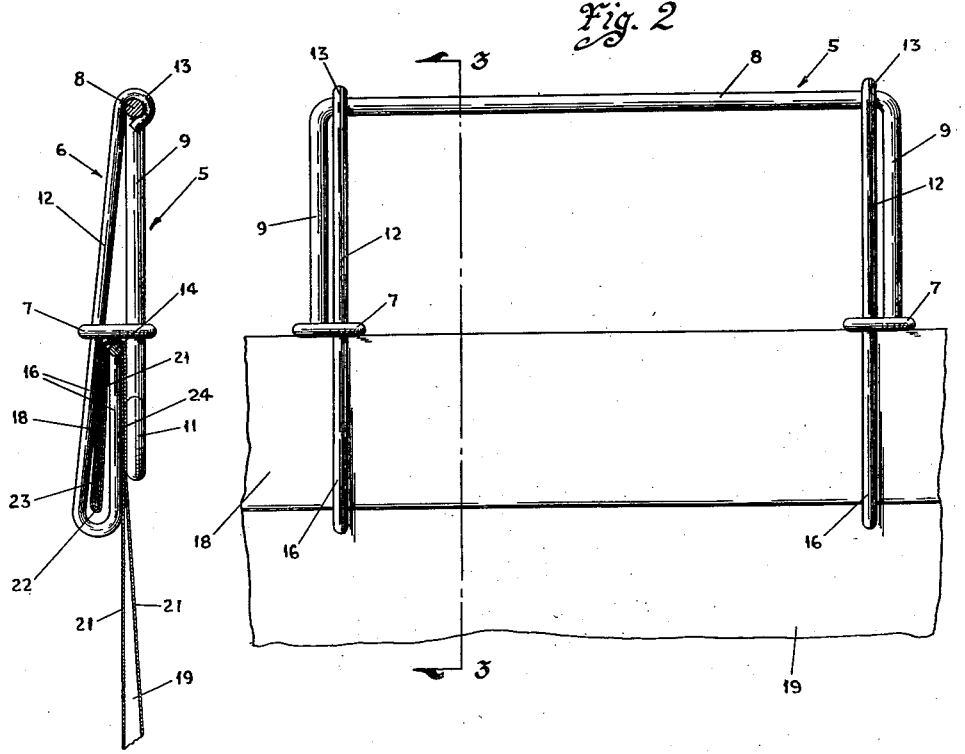
Fig. 2
Fig. 3
Inventor
Gene S. McGuire
By Rudolph L. Lowell
Attorney Patented Nov. 27, 1951

2,576,259

UNITED STATES PATENT OFFICE 2,576,259

HANDLE ATTACHMENT FOR BAG CONTAINERS

Gene S. McGuire, Des Moines, Iowa, assignor of one-fourth to Ross Wallace and one-fourth to Don McMurray, both of Des Moines, Iowa Application May 15, 1950, Serial No. 161,977

4 Claims. (Cl. 224—45)

This invention relates generally to carrying handles for bag containers and in particular to a handle attachment for bag containers.

An object of this invention is to provide an improved handle attachment capable of being releasably attached to a bag container for carrying purposes.

A further object of this invention is to provide a handle attachment for a bag container of a construction such that the upper or open end of the bag, on being closed by moving the sides thereof against each other and then folding over such upper end when so closed, is positively clamped and held for bag carrying purposes and substantially sealed against the admission of air thereto.

Still another object of this invention is to provide a handle attachment for bag containers of thermally insulated type for carrying beverages, ice cream and the like, which is adapted to be positively clamped on the upper end of the container to carry the same, concurrently with maintaining such container end thermally sealed.

Further objects, features and advantages of this invention will become apparent from the following description when taken in connection with the accompanying drawing in which:

Fig. 1 is a perspective view of the handle attachment of this invention shown in an open position;

Fig. 2 is an enlarged side elevational view of the handle attachment shown in closed position and in assembly relation with a bag container; and Fig. 3 is a sectional view taken along the line 3—3 in Fig. 2.

With reference to the drawing the handle attachment of this invention is shown in Fig. 1 as being of an all wire construction and including a pair of U-shape members 5 and 6, and a pair of clamping rings 7 loosely mounted about the base section 8 of the U-member 5, which is to be hereinafter referred to as a handle member. The free ends of the leg sections 9 of the handle member 5 terminate in loops 11 arranged in the plane of the handle member.

The U-member 6, which shall be termed a support or body member, has the free ends of its leg sections 12 terminating in closed loops 13 which are mounted about the base section 8 of the handle member 5. It is thus seen that the base section 8 and the loops 13 constitute a hinged or pivoted connection between the handle member 5 and support member 6, whereby such two hinged members are pivotally movable toward and away from each other.

The leg sections 12 of the support member 6, at spaced positions from their associated base section 14, are bent back upon themselves to form open loop portions 16 which project laterally from one side of the support member 6 and have their free or terminal ends 17 connected together by the base section 14. The base section 14 and the loop portions 16 thus constitute a loop member which extends longitudinally of the support member 6 between the leg sections 12, which serve as spaced extensions on the loop member for connecting the support member 6 with the base section 8. It will be noted that the handle member 5 and support member 6 are constructed so that on relative movement of the members 5 and 6 toward each other, the loop ends 11 on the leg sections 9 are engageable with the loop portions 16 on the support member 6.

In the use of the handle attachment for bag carrying purposes the open or upper end 18 of a bag container, indicated at 19, is initially closed by merely moving the opposite sides 21 of the container 19 against each other, as shown in Fig. 3. With the container thus closed at its upper end 18, such end is folded back upon itself as shown at 22 so as to form a fold portion 23 of a length substantially equal to the length of the loop portions 16.

With the fold portion 23 of the upper end 18 of the bag received within the loop portions 16, as best appears in Fig. 3, the remainder of the bag container 19 is overhung from the base section 14 so as to project downwardly therefrom. It is seen, therefore, that the bag container 19 is thus folded at both 22 and at the base section 14 and with this double fold acting to air-seal the upper end 18 of the bag.

With the bag 19 thus assembled relative to the loop portions 16 and base 14 the handle member 5 is pivotally moved relative to the support member 6 to a closed position for the members 5 and 6, as shown in Figs. 2 and 3, in which the loop members 11, are moved adjacent to the loop portions 16. Since the bag 19, when overhung from the base 14, is positioned against the loop portions 16, it is seen that the portion 24 of the container 19 arranged to the outside of the loop portions 16 is located between the loop portions 16 and the loops 11. On movement of the clamping rings 7 off the base section 8 and about the leg sections 9 and 12 of the members 5 and 6, respectively, the bag portion 24 is frictionally clamped between the loop portions 16 and the loops 11. This clamping action, in conjunction with the folding of the bag 19 over the base section 14, provides for a positive gripping action of the handle attachment with the bag for carrying purposes.

The sealing of the bag 19 at the fold 22 and at the base section 14 has been found to be very desirable where the bag 19 is of a thermally insulated type commonly used in the packaging of beverages and ice cream in direct consumer sales. Where these materials are initially at a cooled temperature, on being placed in a thermally sealed container 19, and the container is then sealed as above described for assembly with the handle attachment, they are retained cooled for extended periods of time. This sealing action on the container by the handle attachment thus provides for a refrigerated transport of beverages and the like for picnic and traveling purposes, concurrently with the provision of a positive carrying handle for the container.

To remove the handle attachment from the container 19 the clamping rings 7 are merely moved off of the leg sections 9 and 12 and about the base section 8, whereby the members 5 and 6 are freely movable away from each other to their open positions shown in Fig. 1, in which the upper end 18 of the bag 19 is readily movable out of the loop portions 16. This removal of the bag 19 can take place by either lifting the upper end 18 thereof outwardly from the loop portions 16, or by sliding the bag along the base section 14 laterally outwardly from the loop portions 16.

Although the invention has been described with respect to a preferred embodiment thereof it is to be understood that it is not to be so limited since changes and modifications can be made therein, which are within the full intended scope of this invention as defined by the appended claims.

I claim:

1. A handle attachment for a bag container including a pair of U-shape members each of which members includes a pair of legs and a base portion extended between one of the ends thereof, means pivotally connecting the other ends of the legs of a first one of said U-members with the base portion of the second one of said U-members for pivotal movement about said base portion as an axis, with said one ends of the legs on said first U-member being formed with oppositely arranged open loop portions such that the base portion of said first U-member extends between the terminal ends of said loop portions, and clamping rings loosely mounted about the base portion of the second U-member for movement about the legs of said U-members to clamp said U-members together in a side by side relation.

2. A handle attachment for a bag container comprising a support member having a laterally projected longitudinally extended open loop portion formed at one side thereof for receiving the upper end portion of a bag container therein such that the remainder of the container overhangs the terminal end of said loop portion so as to project downwardly therefrom, a U-shape handle member having a base and leg sections, with said base being pivotally connected to the other side of said support member for pivotal movement about said other side so that the leg sections are movable toward and away from said loop portion, and means for releasably clamping said leg sections against said loop portion whereby to frictionally clamp the overhanging portion of said container between said loop portion and said leg sections.

3. A handle attachment for a bag container including a pair of U-shape members each of which includes a pair of legs and a base portion extended between one of the ends thereof, means pivotally connecting the other ends of the legs of a first one of said U-members with the base portion of the second one of said U-members, with the one ends of the legs of the U-member being bent back upon themselves to form loop portions having the terminal ends thereof connected together by the base portion of said first U-member, and means for releasably clamping together the legs of said U-members, when said second U-member has the legs thereof pivotally moved to positions against said loop portions.

4. A handle attachment for a bag container including a pair of members hinged together for pivotal movement toward and away from each other to open and close the positions therefor, an open loop portion projected laterally from a side of one of said hinge members such that on movement of said hinged members to a closed position against each other said loop portion is adjacent the other of said hinged members, and means for releasably clamping said hinged members together in said closed position.

GENE S. McGUIRE.

No references cited.